United States Patent

Menne

[15] 3,703,262
[45] Nov. 21, 1972

[54] PUSH BUTTON LOCK FOR FISHING REELS

[72] Inventor: Eugene P. Menne, Mankato, Minn.
[73] Assignee: Johnson Diversified, Inc., Mankato, Minn.
[22] Filed: July 16, 1970
[21] Appl. No.: 55,452

[52] U.S. Cl. ............................. 242/84.2 A, 74/531
[51] Int. Cl. ........................................... A01k 89/00
[58] Field of Search ..... 242/84.2 A, 84.21 A, 84.2 R; 74/531

[56] References Cited

UNITED STATES PATENTS

| 2,828,088 | 3/1958 | Denison et al. | 242/84.2 A |
| 3,166,267 | 1/1965 | Rowe | 242/84.2 R |
| 2,843,333 | 7/1958 | Jones | 242/84.2 A |

FOREIGN PATENTS OR APPLICATIONS

| 1,297,848 | 5/1962 | France | 242/84.2 A |

*Primary Examiner*—Billy S. Taylor
*Attorney*—Carlsen, Carlsen & Sturm

[57] ABSTRACT

A fishing reel in which a thumb actuated lever is operative between line holding and line releasing positions, which incorporates a slidable locking button that yieldably engages the lever to restrain it in line holding position, to prevent accidental movement of the lever into line releasing position, but which button may be displaced in response to manual pressure on the lever in excess of such imposed restraint, to permit full control of the line by the lever.

7 Claims, 6 Drawing Figures

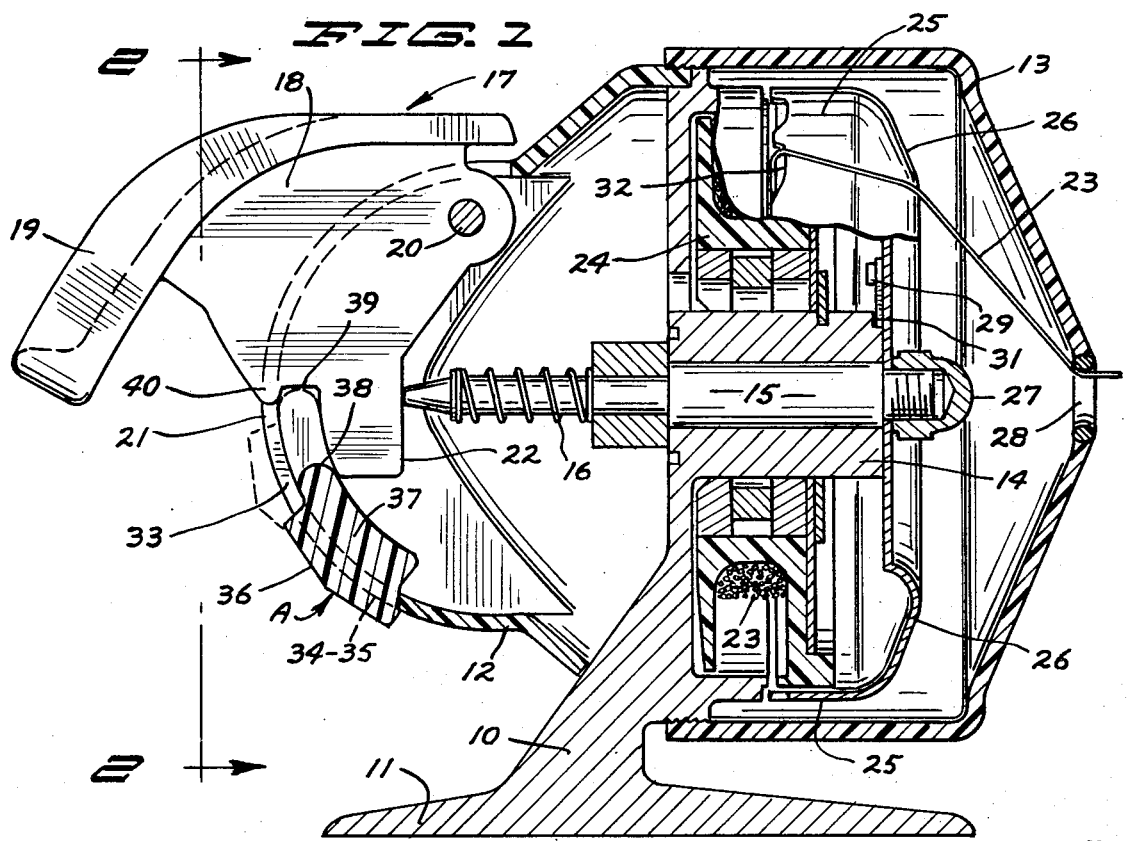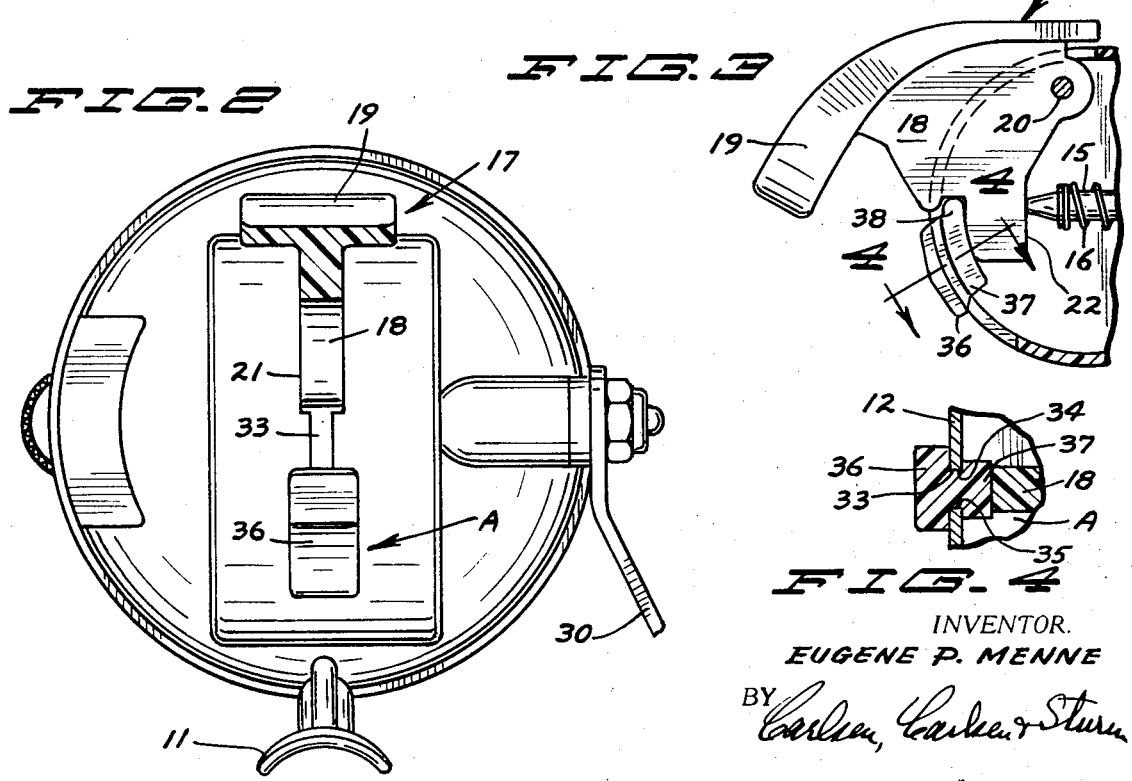

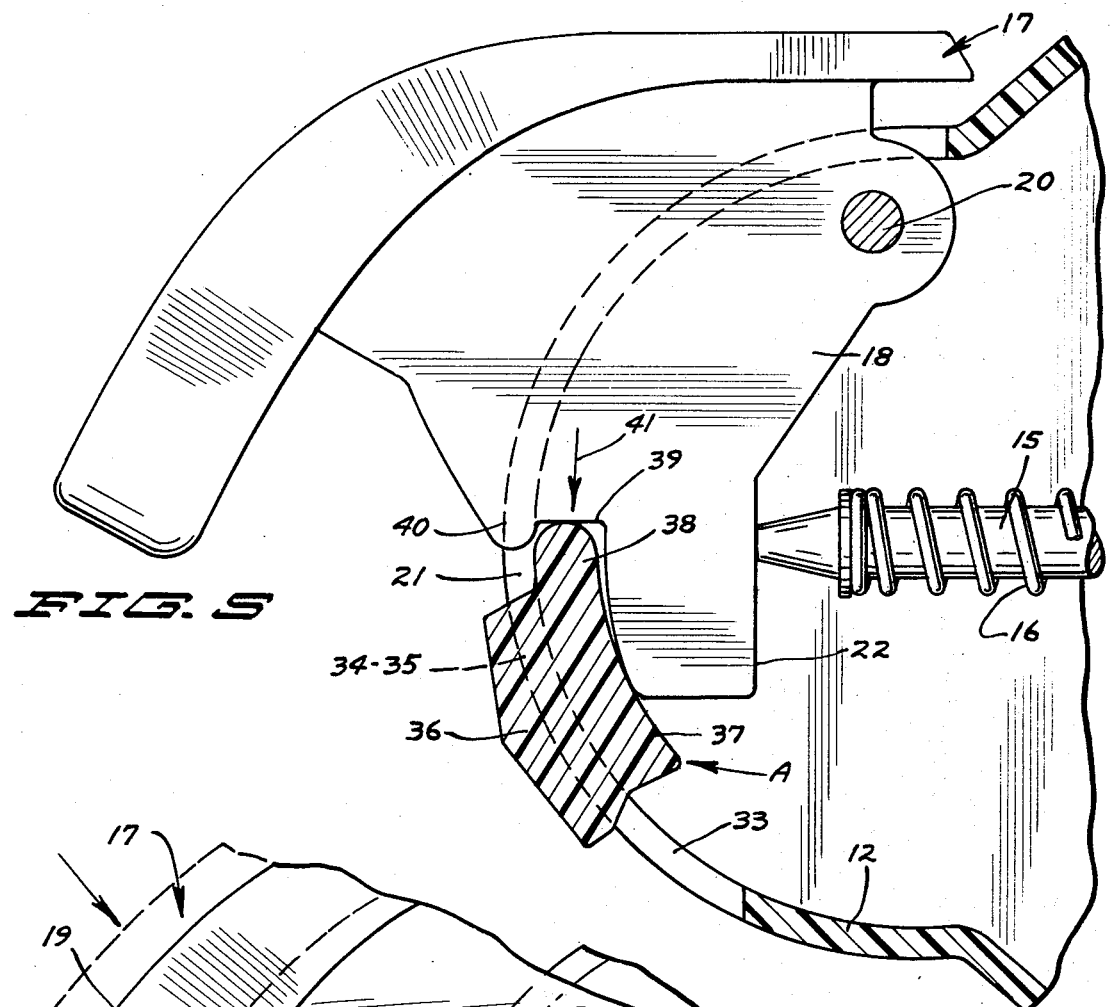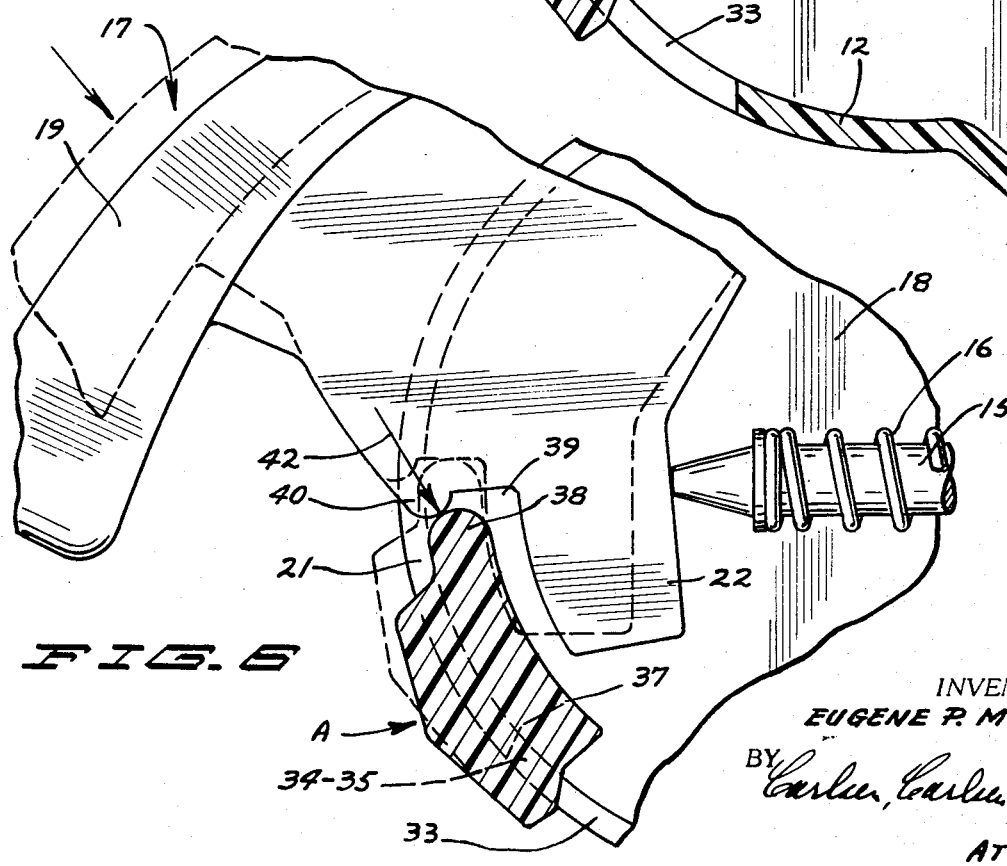

PUSH BUTTON LOCK FOR FISHING REELS

BACKGROUND OF THE INVENTION

This invention relates to fishing reels of the so-called spin casting type in which the line is carried on a normally nonrotatable spool, on which it is wound by a rotatable winding drum when the latter is in one of two axial positions, but from which drum the line is effectively disconnected when the drum is in another axial position so that the line can be released and freely spun off, as in the casting action, and in which the axial position of the winding drum is controlled by an exposed thumb lever customarily projecting from the rear part of the reel housing.

Reels of this type have become very popular and are well known in the art as evidenced by recent L. E. Johnson U.S. Pat. Nos. 3,498,562 and 3,487,658, as well as by earlier Denison and Johnson patents such as U.S. Pat. Nos. 3,026,058, 3,023,978, 2,959,370 and 2,862,679. In all of these instances, as well as in numerous spin casting reels currently on the market and in widespread use, the exposed thumb lever is pivotally mounted in the casing so as to act against the rear end of a slidable drive shaft which carries and rotates the winding drum, so that when the operator depresses the thumb lever he frees the line so that it can escape. To retrieve the line he then only has to turn a hand crank which is connected to said drive shaft in such a manner that it restores the drum to its line winding position.

Meritorious as this general type of line control mechanism is it has presented one functional problem, for which a practical or suitable solution has not heretofore been found, and that is that when the fisherman desires to troll, or merely move his boat to another fishing area, he instinctively or of necessity lays his rod down in the boat, with the reel adjacent to the seat on which he is sitting, and, since the weight of the reel gravitates it to an underslung position, it is found that the aforesaid thumb lever frequently contacts the seat, tackle box, bait container, or other object, to accidentally or inadvertently trigger the winding drum into line disengaging position. This in turn allows the lure to drop into the water, thus stripping out the line, without the operator noticing it, and sometimes resulting in losing the entire rod and reel over the side of the boat.

This objection appears to have been first recognized by the aforesaid Denison and Johnson, patentees, in connection with an earlier design of spinning reel, as shown in their U.S. Pat. No. 2,828,088 in which the axial position of the winding member 33 is controlled by an exposed control button 44, and to prevent the accidental displacement of this button 44 it may be locked against inward movement by manually depressing a knob 75 which moves the extension 77 of a shoe 73 into stopping engagement with the button 44.

As a solution to the objection as it was found to exist in the aforesaid more recent types of spinning reels, wherein the position of the winding member was controlled by a rearwardly exposed thumb lever, the original assignee of the Denison and Johnson patents incorporated, in one of its models known as the GULL, an arcuate button lock element that was pivoted to the reel case under the thumb lever and could be swung into or out of engagement with the lever.

Both of the aforesaid locking devices were incorporated in reel models sold commercially by the predecessor assignee of the above enumerated patents, but the manufacture and sales of such models have long since been discontinued as being impractical or unsatisfactory for various reasons, including cost and slowness of the inherent or required dual operating action.

To overcome this problem as it is found in more modern reels I have developed and perfected the present invention by designing and incorporating a device that will not only lock the thumb lever against accidental line releasing action, but which is so constructed that the operator may, in an emergency, such as when hooking a fish while trolling, immediately retain control of the line by exerting pressure on the thumb lever in excess of that required by accidental release of the winding drum. In short, he can, by such additional pressure, cause the locking element to disengage itself from the lever without separately doing so and without breakage of parts. Additionally the locking device is unitary in construction, and can be embodied with simple manufacturing procedures and at low cost, all important factors in the successful commercial production of reels.

DRAWINGS AND DESCRIPTION

In the accompanying drawings, which illustrate a preferred embodiment of the invention, FIG. 1 is a longitudinal sectional elevation of a spin casting reel embodying my improved push button lock, with the locking element in its inactive position, but also showing it, by dotted lines, in its releasably locked position with respect to the thumb lever.

FIG. 2 is a cross sectional elevation on the line 2—2 in FIG. 1, but on a slightly reduced scale.

FIG. 3 is a detailed sectional elevation corresponding to a portion of FIG. 1, but also on a reduced scale, and with the lock button or member in its raised position to fully engage and secure the thumb lever against accidental displacement.

FIG. 4 is an enlarged detail section on the line 4—4 in FIG. 3.

FIG. 5 is an enlarged detail sectional elevation corresponding to FIG. 3, but more clearly illustrating certain relative shapes and angles of contact that are of importance in the operation of the locking device.

FIG. 6 is a detail elevation similar to a portion of FIG. 5, but with the thumb lever and locking piece in a partially adjusted position.

Referring to the drawings more particularly and by reference characters, 10 designates the main frame of a spin casting reel having a tang 11 by which it is attached to the casting rod in any well known manner. The frame 10 cooperates with rear cover 12 and front cover 13 to form a hollow body containing the reel mechanism. Such mechanism essentially includes a bearing 14 integral with frame 10 in which is slidably and rotatably mounted a shaft 15 that is yieldingly held in a rearward position by a spring 16 but may be moved forwardly by a thumb lever 17 that is generally T-shaped in cross section, as shown in FIG. 2, to incorporate a vertical plate portion 18 and a curved top portion 19 that is exposed for convenient engagement by the thumb of the operator. The lever 17 is pivotally secured by a pin 20, carried by the rear cover 12, for oscillation with its plate part 18 guided in an elongated slot 21, in the cover, and the forward edge of the plate 18 has a generally vertical edge surface 22 engageable with the rear end of shaft 15 to press it forwardly against the tension of spring 16.

The fish line 23 is wound on a spool 24 mounted on the bearing 14 within the front cover 13 and is normally non-rotatable so that the line may be stripped or peeled from it during the casting operation, the line passing over the rim 25 of a pick-up rotor 26 that is secured to the front end of shaft 15 by a nut 27, and then passes radially inwardly and forwardly to the guide opening 28 from which it passes outward in response to the pull of the lure. To snub the line, to control the forward flight of the lure, the rotor 26 is moved to its extreme forward position so as to clamp the line between the rotor and a part of the front cover 13 in a well known manner. This extreme forward position of the rotor is also given it when the cast is to be made so as to hold the line firmly and prevent its escape until the rod has been swung or projected to its desired forward position. When the thumb piece 17 is then released the rotor 26 is moved rearwardly until a small lever 29 on the rotor contacts the end surface of the bearing 14 but before the rotor reaches its initial rearward position, thus holding the rotor in an intermediate position in which the line may freely be stripped off.

When the line is to be retrieved the operator merely turns a crank 30 which operates through suitable gearing to turn the shaft 15 until the lever 29 can drop into a cam recess 31 in bearing 14, so that the rotor may resume its most rearward position at which time notches 32 in the rear of rim 25 will project back sufficiently to engage the line passing over the rim and thus provide the winding operation. Instead of having line engaging notches the rotor may have extensible pick-up pins for that purpose, as shown for instance in the Denison and Johnson U.S. Pat. Nos. 2,828,088, 2,862,679 or 2,959,370.

The reel structure and mechanism as thus far described is all substantially old in the art, as indicated by the patents that have been identified, and numerous others, but an understanding of which is essential to an appreciation of the present invention. Thus, it will be seen that when the lure has been partially or wholly retrieved, the winding rotor is in its rearmost position and the line is prevented from escaping. Should the operator, however, lay the rod down with the reel in an underslung position so that the thumb lever 17 is accidentally touched, to thereby trigger the winding rotor 26 to its intermediate position, the line will be released and if the lure is hanging in the water the entire outfit may easily be lost.

To guard against this contingency I have extended the slot 21 in the rear cover downwardly in a relatively narrow extension 33, and have inserted therein a lock button or member A which is generally H-shaped in cross section as shown in FIG. 4. The member A is provided with a pair of lateral grooves 34–35 which are curved to conform with the curvature of the rear cover, and slidably engage the opposed cover edges forming the slot extension 33.

The exposed or outer lug portion 36 of the member A is substantially wider than the slot extension, and is preferably knurled to facilitate its vertical movement by the operator. The inner lug portion 37 of the lug is also wider than the slot extension 37 but is sufficiently narrow so that it can pass inwardly through the slot 21 proper when the lever 17 has not been secured by the pivot pin 20. In this manner the member is permanently secured in its operative position by the thumb lever, while still being free to function, will not require any separate rivets or fastening device, and can easily be replaced, if necessary, merely by temporarily removing the pin 20 and thumb lever 19.

By particular reference to FIGS. 5 and 6 it will be seen that the lug part 37 of member A has an upper extension 38 that is rounded to extend into a recess 39 in plate 18, while the inner face of the member A is generally curved to conform with the curvature of the rear edge of the lower part of the member. Also that the recess 39 is defined in part by a downwardly projecting heel element 40 which is so arranged that it has no influence on the member A when the latter is in its uppermost position, as in FIGS. 1, 3 and 5.

The lock button A is preferably made of plastic or other slightly resilient material and is formed to fit in the slot extension 33 quite snugly so that it will frictionally yet yieldingly retain the position to which it is adjusted by the operator who can move it up or down merely by engaging its outer knurled surface. The frictional resistance to its movement is generally sufficient to prevent the accidental tripping of the lever, but even if not entirely sufficient such resistance is almost immediately increased by a slight lowering of the button from its uppermost position.

This will be evidenced by a consideration of FIGS. 5 and 6 in which it will be seen that when the button A is in its uppermost position (FIG. 5) the heel 40 is out of contact with the button and initial pressure on the thumb lever 17 will contact the lug extension 38 in such a manner that the pressure from lever 17 will be in virtual alignment (see arrow 41) with the contacting surfaces between the button channels 34–35 and the cover 12, when the least amount of frictional resistance is produced. Should such initial movement be exceeded then, by virtue of the arcuate movement of the plate 18 around pivot pin 20, the heel 40 will move inwardly against the extension 38 to create a lateral pressure, as indicated by arrow 42, to thereby increase the frictional resistance to downward movement of the button in its slot extension 33. This resistance is not, however, of such degree as to cause breakage of parts or to interfere with the continued action of the lever in moving the button to its lowermost position, as in FIG. 1, until it is to be used again.

As a matter of fact when the button A reaches a point slightly below the position shown in FIG. 6, the arcuate movement of the lever 17 will swing the heel 40 forwardly until it has direct end contact with lug 38, thus losing the aforesaid lateral pressure (arrow 42) and restoring action of the lever against the button with a snap action and in a direction aligned with the arcuate movement of the button.

In other words, and to capsulate the operation, the button A is normally left in its lowermost position, but if the rod is to be put down for any reason the operator merely pushes the button A up into its locked position first, so that the line will not be accidentally released.

When he picks it up again he may merely lower the button by reverse action on it. But if a fish has struck or fast action is otherwise necessary, he merely grasps the rod and by thumb action on the lever 17 he can quickly disengage the lock and immediately retain full control of the line.

Having now therefore fully illustrated and described by invention, what I claim to be new and desire to protect by Letters Patent is:

1. In a fishing reel having a line spool; a shaft mounted for axial and rotatable movement with respect to and adjacent said spool; a line winding member mounted on the end of said shaft adjacent said spool, said member being operable to engage and wind a line onto said spool and to disengage said line and allow free withdrawal of line from said spool; manually operable shaft positioning means moveably mounted on said reel, said shaft positioning means including a portion operable to engage the other end of said shaft to axially position said shaft and said winding member with respect to said line spool; a locking member; means moveably mounting said locking member on said reel; and means on said shaft positioning means and said locking member for yieldably securing said shaft positioning means in a first locked line engaging position and to move said locking member to a position to release said shaft positioning means when a predetermined manual force is applied to said last named means through movement of said shaft positioning means, whereby said shaft positioning means may be operable to axially position said shaft and said line winding member.

2. The apparatus of claim 1 in which the means on the shaft positioning means and the locking member includes cooperable surface means for initially yielding to a substantial force and thereafter yielding to a lower force to release the shaft positioning means from the locking member.

3. In a fishing reel having a line spool, a shaft mounted for axial and rotatable movement with respect to the spool, a winding member carried by the shaft for movement therewith and selectively held in line winding position with respect to the spool, a manually operative lever pivotally carried by the reel for arcuate movement in a plane coincident with the axis of the shaft and for endwise engagement with the shaft to axially adjust the latter and thereby move the winding member to a position where it will effectively free itself from line winding engagement, said lever having a recess for receiving one end of a locking button, said recess including an abutment operative to regularly contact a locking button and move it into inactive position, and a locking button slidably mounted in the reel for movement in the aforesaid plane to yieldably engage said lever and thereby releasably secure the winding member in its line winding position.

4. In a fishing reel, a hollow body member containing line reeling mechanism and formed in part by a front cover through which the line passes from the reeling mechanism, said reeling mechanism including an axially adjustable line control shaft extending coaxially and rearwardly with respect to said front cover, said body member also being formed in part by a rear cover enclosing the rear-end of said shaft and having an elongated slot aligned rearwardly behind the shaft, a manually operative line control lever pivotally mounted in said slot for arcuate movement in a plane coincident with the axis of the shaft and for endwise contact therewith to move it axially, and a locking button, having side channels adapted to receive and frictionally engage cover parts forming the slot, slidably secured in the slot for selective engagement with the lever to releasably secure the latter in an inactive position.

5. In a fishing reel, a hollow body member containing line reeling mechanism and formed in part by a front cover through which the line passes from the reeling mechanism, said reeling mechanism including an axially adjustable line control shaft extending coaxially and rearwardly with respect to said front cover, said body member also being formed in part by a rear cover enclosing the rear-end of said shaft and having an elongated slot aligned rearwardly behind the shaft, a manually operative line control lever, having a recess adapted to receive one end of a locking button, pivotally mounted in said slot for arcuate movement in a plane coincident with the axis of the shaft and for endwise contact therewith to move it axially, and a locking button slidably secured in the slot for selective engagement with the lever to releasably secure the latter in an inactive position.

6. The apparatus of claim 1 in which means moveably mounting the locking member is a slot in the fishing reel and the shaft positioning means are moveably disposed in said slot and said locking member includes means for frictionally engaging the sides of said slot.

7. The apparatus of claim 1 in which the means on the shaft positioning means and the locking member includes cooperable surfaces operable in response to a predetermined degree of manual pressure to release the shaft position means.

* * * * *